US009926197B2

(12) United States Patent
Liu et al.

(10) Patent No.: US 9,926,197 B2
(45) Date of Patent: Mar. 27, 2018

(54) METHOD AND APPARATUS FOR PRODUCING COMPOUND POWDERS

(71) Applicants: Bo Liu, Spokane Valley, WA (US); Hongjie Qiu, Milpitas, CA (US)

(72) Inventors: Bo Liu, Spokane Valley, WA (US); Hongjie Qiu, Milpitas, CA (US)

(73) Assignees: Bo Liu, Spokane Valley, WA (US); Hongjie Qiu, Milpitas, CA (US)

( * ) Notice: Subject to any disclaimer, the term of this patent is extended or adjusted under 35 U.S.C. 154(b) by 235 days.

(21) Appl. No.: 15/132,070

(22) Filed: Apr. 18, 2016

(65) Prior Publication Data

US 2016/0257566 A1     Sep. 8, 2016

Related U.S. Application Data

(63) Continuation of application No. 13/414,403, filed on Mar. 7, 2012, now abandoned.

(51) Int. Cl.
| | |
|---|---|
| *B22F 9/02* | (2006.01) |
| *C01B 6/24* | (2006.01) |
| *B22F 9/08* | (2006.01) |
| *C01B 6/00* | (2006.01) |
| *C01B 9/00* | (2006.01) |
| *C01B 13/32* | (2006.01) |

(Continued)

(52) U.S. Cl.
CPC .............. *C01B 6/24* (2013.01); *B22F 9/08* (2013.01); *C01B 6/00* (2013.01); *C01B 9/00* (2013.01); *C01B 13/326* (2013.01); *C01B 17/20* (2013.01); *C01B 21/06* (2013.01); *C01B 21/0602* (2013.01); *B22F 2009/0824* (2013.01); *B22F 2999/00* (2013.01)

(58) Field of Classification Search
CPC .......... B22F 2999/00; B22F 2009/0824; B22F 2201/10; B22F 9/08; C01B 6/24; C01B 13/326; C01B 21/0602
See application file for complete search history.

(56) References Cited

U.S. PATENT DOCUMENTS

| | | |
|---|---|---|
| 3,655,837 A | 4/1972 | Reed et al. |
| 5,073,409 A | 12/1991 | Anderson et al. |

(Continued)

OTHER PUBLICATIONS

Non-Final Office Action dated Apr. 9, 2014, of U.S. Appl. No. 13/414,403 by Liu et al., filed Mar. 7, 2012.

*Primary Examiner* — Joseph S Del Sole
*Assistant Examiner* — Thu Khanh T. Nguyen
(74) *Attorney, Agent, or Firm* — Perkins Coie LLP (57) ABSTRACT

A gas atomization apparatus is disclosed for producing high purity fine refractory compound powders. After the system reaches high vacuum, a first stage inert atomizing gas breaks superheated metal melt into droplets and a second stage reactive atomizing gas breaks the droplets further into ultrafine droplets while reacts with them to form refractory compound powders. The first stage atomizing gas is inert gas able to break up melt into droplets and prevent crust formation on the nozzle front. A reaction time enhancer is arranged at bottom of reaction chamber to furnish a reactive gas flow in a reverse direction of the falling droplets and powders. Under the reverse gas flow, the falling droplets and powders change moving direction and travel longer distance in reaction chamber to increase reaction time. This apparatus can produce refractory powders with ultrahigh purity and uniform powder size while maintain high process energy efficiency.

19 Claims, 12 Drawing Sheets

(51) Int. Cl.
*C01B 17/20* (2006.01)
*C01B 21/06* (2006.01)

(56) References Cited

U.S. PATENT DOCUMENTS

| | | |
|---|---|---|
| 5,368,657 A | 11/1994 | Anderson et al. |
| 5,372,629 A | 12/1994 | Anderson et al. |
| 5,589,199 A | 12/1996 | Anderson et al. |
| 5,811,187 A | 9/1998 | Anderson et al. |
| 6,444,009 B1 | 9/2002 | Liu et al. |
| 7,208,107 B2 | 4/2007 | Jurgens et al. |
| 8,216,339 B2 | 7/2012 | Forbes Jones et al. |

METHOD AND APPARATUS FOR PRODUCING COMPOUND POWDERS

CROSS REFERENCE TO RELATED APPLICATIONS

This application is a continuation of U.S. patent application Ser. No. 13/414,403, entitled "APPARATUS FOR PRODUCING REFRACTORY COMPOUND POWDERS", filed on Mar. 7, 2012, of which is incorporated herein in its entirety by this reference thereto.

FIELD OF THE INVENTION

The present invention relates to a method and apparatus of making refractory compound powder materials, especially the realization of amorphous, polycrystalline or nanocrystalline refractory compound powders through gas atomization reaction synthesis between a metal melt and reactive atomizing gas in an atomization reaction chamber. This invention uses inert gas as the first stage atomization gas to prevent crust formation on the fronts of source metal and injection nozzle, and uses reactive gas in the second stage of atomization to break up the already atomized metal droplets further into even finer droplets while to react with the droplets to form refractory compound powders. A reaction time enhancer is provided to increase the reaction time between metal droplets and reactive gas in the reaction chamber. This apparatus and method can be used to produce many types of compound powders through reaction of liquid metal melt with different atomization gases. Examples of the compound powders include various oxide, nitride, carbide, sulfide, hydride and halide etc.

BACKGROUND OF THE INVENTION

Refractory compound materials find many applications in various areas such as automobile, metallurgy, electronics and chemical engineering due to their unique processing characteristics and performance properties. In the case of nitrides, boron nitride (BN) can be used as high temperature lubricants, cutting tools and crucibles; titanium nitride (TiN) is an extremely hard ceramic material, and often used for coatings; aluminum nitride (AlN) is a substrate materials for semiconductor devices and a desired heat spreading material for optoelectronic packaging; and gallium nitride (GaN) based alloys have been the working horse for making blue ray laser and high brightness LED devices, and the latter is poised to revolutionize the lighting industry. This type of examples can keep going for a long list.

Synthesis and processing of refractory compound materials are among the most challenging technologies in current chemical engineering and material science. The conventional crucible melting, casting and subsequent machining practices have been proven impossible for this kind of materials due to their ultrahigh melting points, supreme hardness and low ductility. While powder metallurgy has been proven to be feasible for components fabricated with refractory compounds, the synthesis of powders have been found very time consuming and expensive. Methods for making refractory compound powders include chemical reduction, grinding, Sol-Gel process and carbon thermal reduction etc. Besides the expensive price, the refractory compound powders produced with these methods suffer serious contamination from source materials, process tools and containers.

The gas atomization approach has been widely used for producing metal powders, and this method utilizes high pressure air, nitrogen or argon as spraying medium to break down metal melt stream into melt droplets. In this method, atomization gas traveling in ultrasonic speed is sometimes required to minimize the liquid metal droplet size, and there are also requirements on overheating the liquid source metals to minimize the metal droplet surface tension, sometimes up to temperatures of 2-3 times of their melting points expressed in the unit of Kelvin. Due to the excellent heat exchanging conditions and the fine droplet size, the cooling rate for these droplets can reach levels of 100~10000K/sec. This cooling rate is orders higher than that of casting ingots. As results of this high cooling rate, the atomized powder has very uniform composition and microstructure, and the materials made of this type of powders have superior performance without segregation. Compared to other production methods, the gas atomization has characteristics of low energy consumption, high production efficiency, high purity, fine powder size and easily be adapted to industry scale. Also, almost all metals can be transformed into powders with this atomization method.

While gas atomization has been widely used for producing metal powders, and a few studies show this method can be used for producing thin compound coating layers on the surface of metal powders for improved environmental stability as reported in U.S. Pat. No. 5,073,409 (Dec. 17, 1991), U.S. Pat. No. 5,372,629 (Dec. 13, 1994), U.S. Pat. No. 5,589,199 (Dec. 31, 1996), U.S. Pat. No. 5,811,187 (Sep. 22, 1998) and U.S. Pat. No. 6,444,009 B1 (Sep. 3, 2002)) etc., there are very few successful efforts reported to synthesize refractory compound powders with this method due to exceptionally high melting points and the tendency to dissociate at that high temperature as well as the electrical insulation properties of the refractory compound materials. There is simply no suitable method to melt the source refractory compounds into superheated liquids.

In this invention, a gas atomization method is proposed to produce high purity refractory metal powders in a cost-effective way with fast production rate. In this invention, the reaction chamber is first pumped to ultrahigh vacuum, and then elementary metal melt is atomized into fine droplets and react with reactive gas to form the refractory compound powders. To make sure the metal melt completely transfer into compound powders, a mechanism is proposed to increase the reaction time between metal droplets and the reaction gas. Characteristics of this method include high purity, fine powder size, fast production rate and energy efficient as well as minimized impact to environment.

SUMMARY OF THE INVENTION

In this invention we are disclosing a new method and apparatus for making high purity refractory compound powders with fast production rate. Examples of the compound powders include metal oxide, hydride, nitride, halide and sulfide etc.

The most prominent part in this apparatus is a mechanism of reaction time enhancer to allow extra reaction time between metal droplets and reaction media. With this mechanism, an extra reactive gas flow is provided to change the moving direction of droplets and powders to make sure they stay longer in the reaction chamber, thus the reaction time between the droplets and powders can be significantly increased to allow most of the metal transfer into compound powders. For the atomization part, the gas atomizer is comprised of two stages. In first stage atomization, the melt metal is impinged with inert gas to break up the metal melt into droplets. The inert gas can prevent formation of high melting point compound crust on the nozzle fronts to make sure liquid metal can be continuously supplied into the atomization chamber. In the second stage atomizer, the atomizing gas is composed of carrier and reactive gases with a purpose to transfer metal droplets into compound powders. The reactive gas can be a single or a mixture of multiple reactive species, such as a combination of $N_2$, $NH_3$ and $O_2$ etc. The ratio of carrier and reactive gases is adjustable.

While the heat released from the liquid metal and the compound forming reaction maintains the reaction chamber in high temperature, and at this high temperature, the surface layer of metal droplets can quickly transfer into compounds within a short time, the dwelling time of the droplets in a typical atomization system is not long enough for complete transferring of the metal droplets into compound powders. To extend the reaction time between droplets and the reactive gas, a reaction time enhancing device is provided at the lower end of the reaction chamber in this invention. This reaction time enhancing device effectively provides a gas flow in the reverse direction to blow the falling powders back into the reaction zone to prolong the reaction time. In real situation, the droplets may have to travel back and forth a few times so the reaction time between reaction gas and metal droplets are significantly prolonged. With this reaction time enhancer, the metal droplets are able to transfer into refractory compound powders before the powders finally get cooled down and collected at the lower collection chamber.

Even the reaction time can be significantly extended with this reaction time enhancer, so most of the metal can be transferred into metal compound powders, it should be recognized that occasionally some reactions may be left unfinished and the collected compound powders may still contain certain percentage of metals. However, supersaturating solid solution has been formed with reactive elements dissolved in the powders, a post atomization treatment in a heated furnace will transfer the residual metal completely into compound. The post heat treatment apparatus is composed of a heating furnace and an atmosphere of reactive agent or protection gas.

Two different approaches can be employed with this invention for making alloy compound powders with multiple metal elements. The multiple metal sources can be pre-alloyed with desired ratios and be melt into a single metal source before atomization, or multiple injection nozzles may be provided for the atomization process, and each nozzle would provide one metal resource for the desired alloy.

The apparatus and method described in his invention can be easily adapted to produce many different powders by adjusting the reaction species and source heating temperature. Examples of compounds made with this method include oxide, nitride, hydride, halide and sulfide etc.

BRIEF DESCRIPTION OF THE DRAWINGS

The invention is illustrated in greater details with reference to the embodiments as described in the accompany drawings, where:

FIGS. 1A-1B show the schematics of a preferred embodiment of an apparatus for fulfilling the purpose of this invention to produce metal compound powders where FIG. 1A shows the reaction chamber and FIG. 1B shows the powder collection and separation system.

FIG. 2A is for atomizer installed on the sidewall and FIG. 2B is for atomizer set up at chamber bottom.

FIGS. 3A-3B are schematics showing the working principle of the first and second stages of the atomization system with different metal source melting methods, where FIG. 3A is with a 2-wire electric arc spray-based device and FIG. 3B is with an induction melting crucible.

FIGS. 5A-5B are schematics showing the cross section of the reactive gas outlets of the reaction time enhancer, where FIG. 5A is with perforated holes on smooth surface and FIG. 5B is with extruded outlet holes.

DETAILED DESCRIPTION OF PREFERRED EMBODIMENTS

Figure 1A:
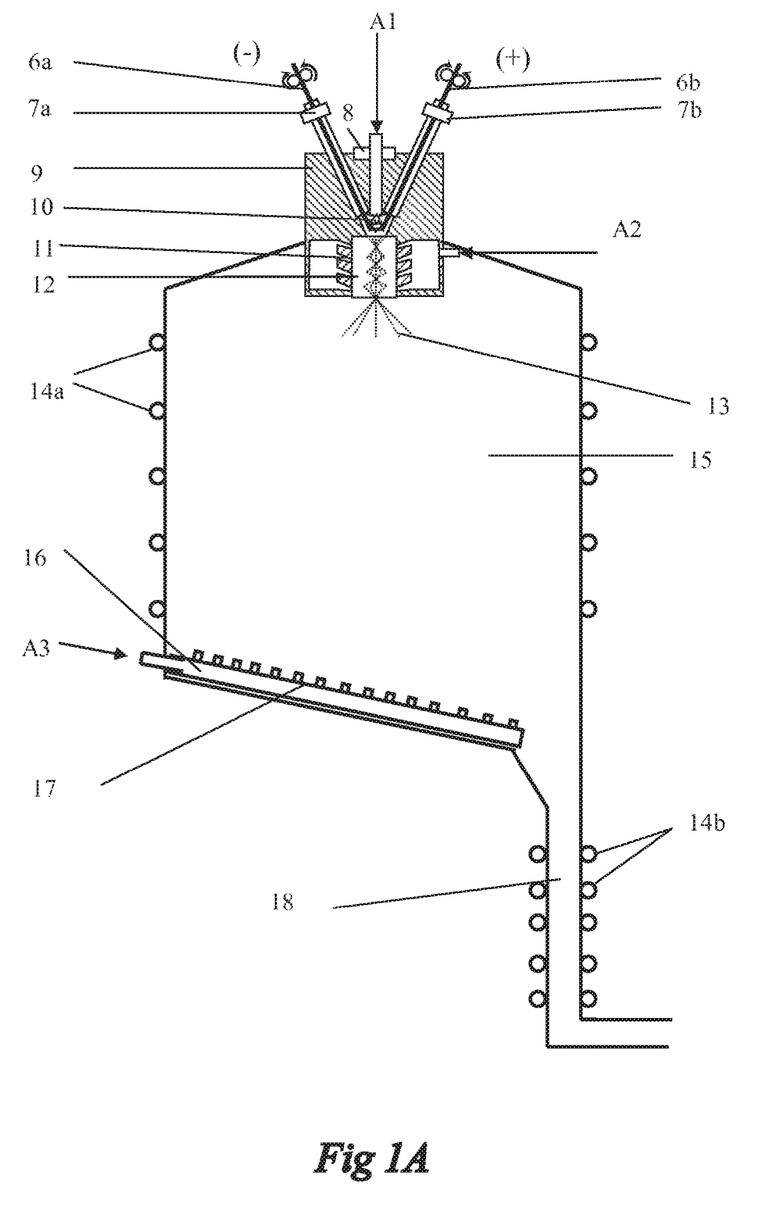
Figure 1B:
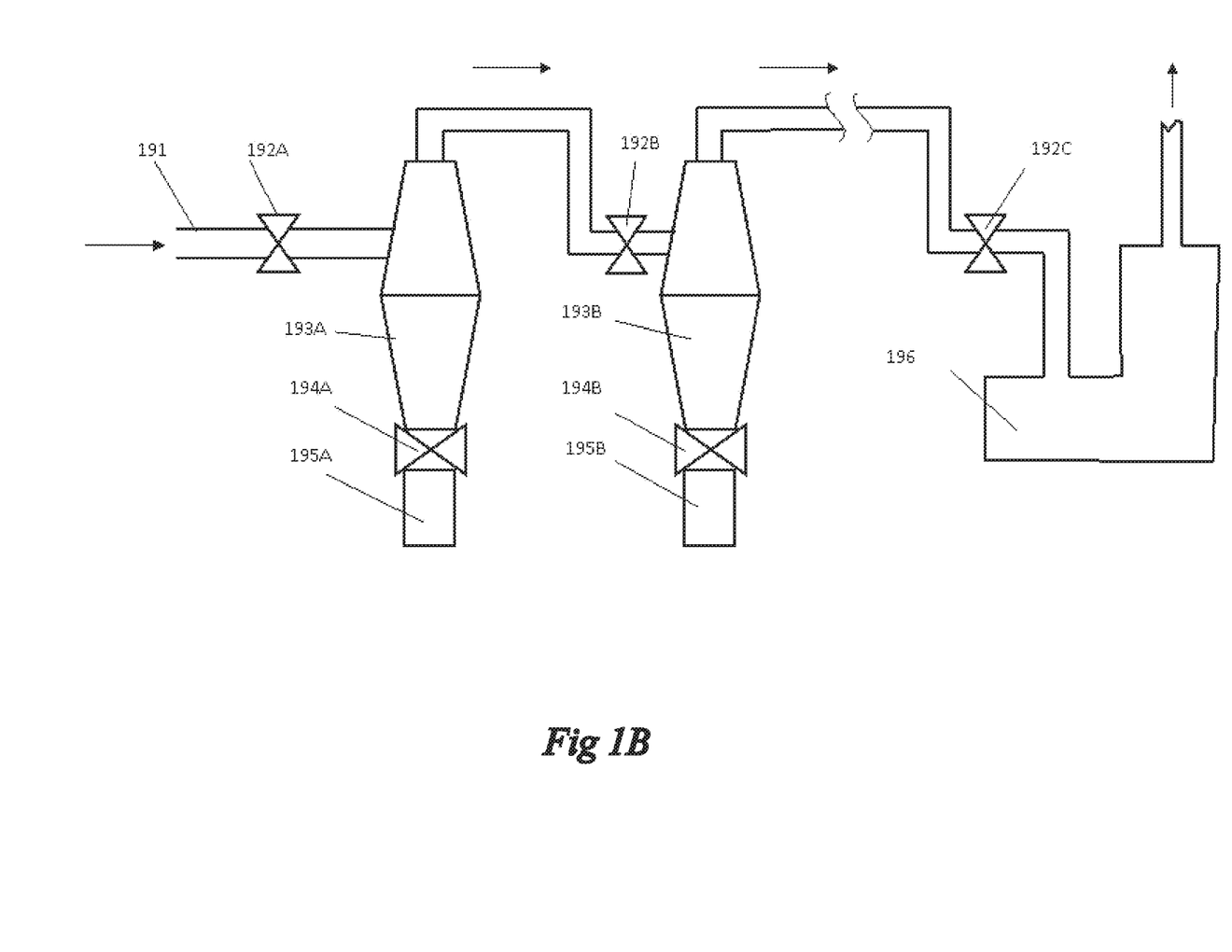

FIGS. 1A-1B show the schematics of a two stage atomization apparatus with a reaction time enhancer, which is a preferred embodiment for use in the practice of current invention for producing refractory compound powders. Besides the vacuum reaction chamber, this apparatus includes three major functional components: (1) the heating unit and the first stage atomizer with inert gas; (2) the second stage atomizing means with reactive gas or diluted reactive gas and (3) the reaction time enhancer that facilitates a reactive gas flow in the reverse direction of falling powders. The reactive gas flow in the reverse direction can force the falling powder travel back to the reaction chamber, thus to increase the reaction time between metal powders and the reactive gas. This reaction time enhancer allows more complete transforming of metal droplets into refractory compound powders.

In the first-stage heating and atomizing means, a heating setup for melting a metal composition is provided. The metal composition is normally supplied in a wire, rod or pellet form. To make sure the metal is still in liquid form after the first stage of atomization, the metal composition is required to be superheated up to a few hundred or even thousand degrees higher than its melting point. The metal composition is required to be composed of reactive metals, so metal compound powders can be formed after the synthesis reaction. The first-stage inert atomization gas would break up the superheated metal melt into fine liquid droplets while prevent inflow of reactive gas from the second stage atomizer thus to prevent formation of high-melting point compound crust around the source metal. FIG. 1A depicted a two wire arc spray heating and atomization system. The heating system is comprised of two source metal wire 6a and 6b, an electrical insulating block 9, the first-stage atomizer 8 and the second-stage atomizer 12. The two metal wires feed through 7a and 7b which are gas-tight. The atomization gases enter the first and second-stage atomizer through inlets of A1 and A2. There is also a voltage bias supplied between the two wires 6a and 6b, either in the form of a DC voltage or a power pulse, which would ignite an arc 10 when the two wires are close enough to each other. The arc, which is at ultra-high temperature up to 5000 to 6000° C., would melt the wire tips and superheat the formed metal melt. The inert atomization gas stream passing through the first stage atomizer 8 breaks up the metal melt into fine liquid droplets and pushes the metal droplets into the second stage atomization chamber 12.

At second-stage atomization, the reactive gas can break up the metal droplets further into ultra-fine metal droplets while react with the droplets to form compound powders. For example, to produce nitride powders, either nitrogen ($N_2$) or ammonia ($NH_3$) or a mixture of $N_2$ and $NH_3$ can be used as the second stage atomizing and reactive gas. The extent of second stage atomization can be optimized by adjusting the size, angle and gas flow rate of injection nozzle 11. Under proper atomization conditions, the droplet size can reach the level of 100 to 200 nm. Because the temperature of melting metal is already high, the adding of heat released from the synthesis reaction between droplet and reactive gas would push the reaction chamber temperature even higher, so the reaction between metal droplets and reaction gas is very vigorous. To make sure the reaction is manageable and to prevent explosion, the reactive gas may have to be diluted with inert gas, and a cooling system 14*a* must be attached to the reaction chamber.

Due to limit dimension of the reaction chamber and fast moving speed of the metal droplets, these droplets only stay for a very short time in the reaction chamber, and leave the synthesis reaction incomplete even the reaction progress is fast at high temperature. To increase the dwelling time of droplets and powders in the reaction chamber, a reaction time enhancer 16 is provided at the lower end of the reaction chamber. The reactive gas flow from the reaction time enhancer moves in the reverse direction of the falling metal droplets, thus changes the traveling direction of falling powders, and to force the metal powders go backward. The droplets and powders may have to travel back and forth a few times in the reaction chamber before reaching the collector outlet, so the effective travel distance becomes much larger. As a result, the reaction time enhancer significantly increases the reaction time between metal droplets and the reactive gas. As mentioned before, the powder forming reaction progresses very fast at high temperature in the reaction chamber, so the increased reaction time would significantly boost the extent of reaction. The extent of enhancement can be further optimized by adjusting gas flow rate and parameters of the spraying nozzle 17.

Besides changing the moving direction of the droplets and powders, the reverse gas flow from the reaction time enhancer can also cool down the droplets and powders, and to prevent the droplets and powders from sticking to each other. The cooling water 14*b* along the conduit 18 to powder collector serves the same purpose to cool down the powder temperature and to reduce powder agglomeration.

Most of the atomized metal droplets can be transferred into compound powders after traveling back and forth a few rounds in the reaction chamber. The formed refractory powders will eventually exit the reaction chamber through the conduit 18 with excess atomization and reaction gases and enter the powder collection and separation system as described in FIG. 1B. The powder collection and separation system is composed of a few stages of cyclone powder collectors of 193A and 193B as well as the wet scrubber 196. The gas flow rates are adjustable through valve 192A, 192B and 192C etc. The combined flux from conduit 18 moves faster when it pass through the first stage powder collector, and only heavy powders with large sizes would fall down and be collected, smaller and lighter powders are carried over by gas flow to the next stage of powder collector. In this way, the powders can be classified based on their size. More collectors may be added to the cyclone collection system if necessary. The collected powders are transferred into containers of 195A and 195B through valves 194A and 194B. At the end of the collection system, the ultra-fine dust and gas products go through a wet scrubber where the gas flow is wet washed and cleaned.

Figure 2A:
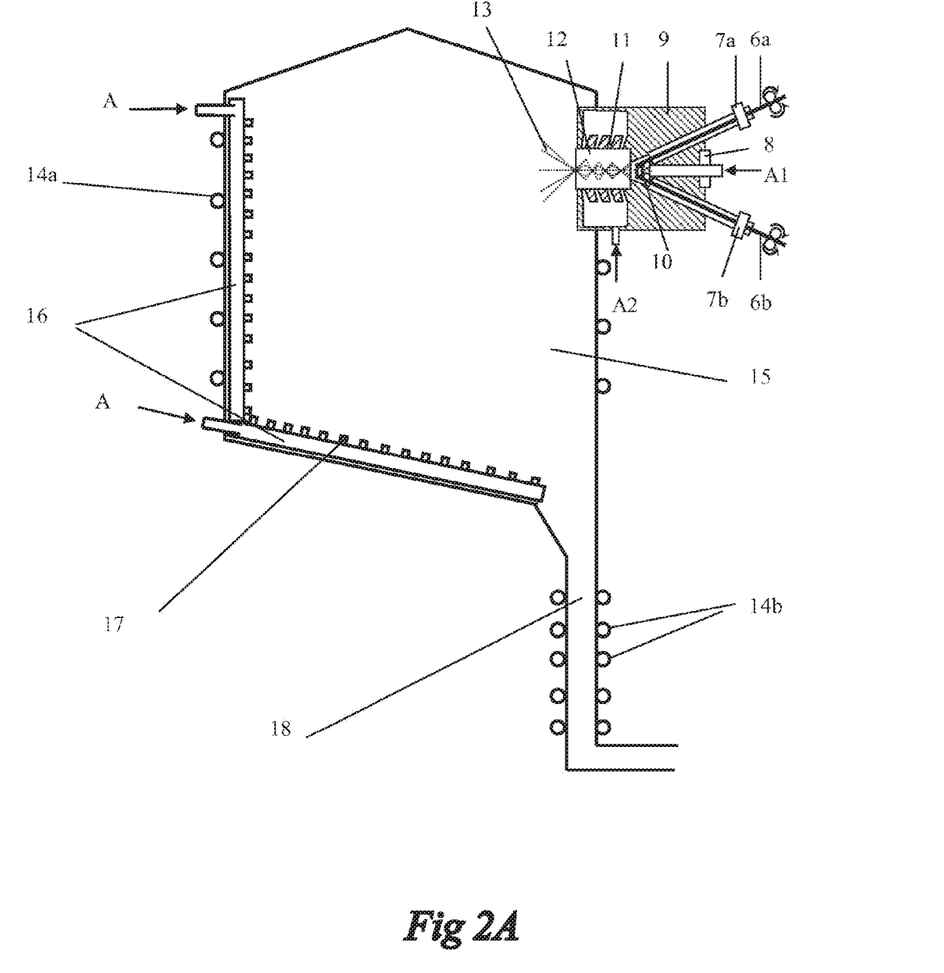
FIGS. 2A-2B show two options of reaction time enhancer arrangement relative to the location of gas atomizer in the reaction chamber, where
Figure 2B:
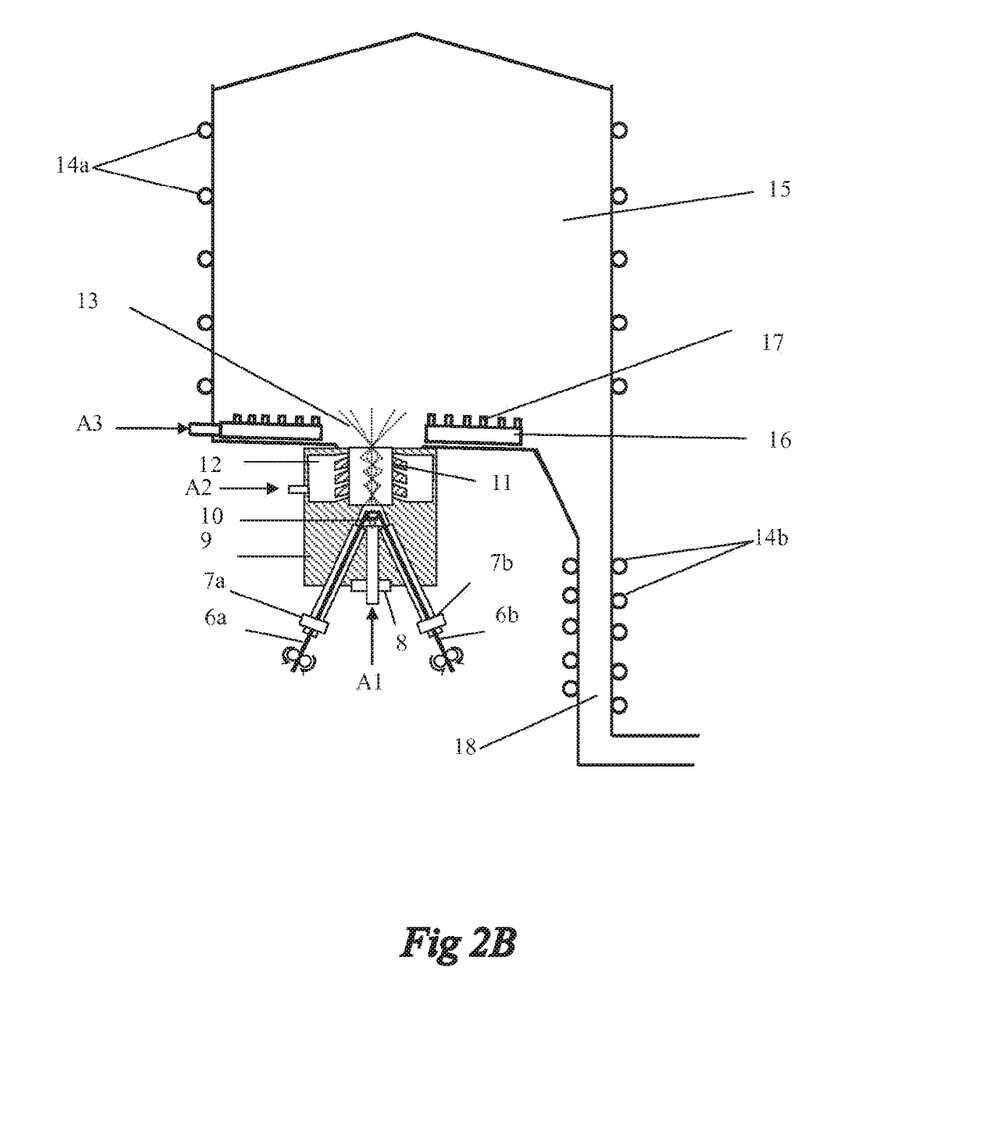

It should be noticed that while the heating source and the two stages of atomizers are arranged at the top of reaction chamber and only three sets of reactive gas orifices are illustrated for the second stage atomization in FIG. 1A, it is apparent to those familiar with the art that the relative locations of the source metal, the atomization system and the reactive time enhancer are adjustable. As an example, FIG. 2A shows an embodiment with the metal melt source on the side of the reaction chamber, and FIG. 2B shows an embodiment with the melt metal source on the bottom of the reaction chamber. All these arrangements shares the same working principle of changing the moving direction, thus to increase the dwelling time of droplets and powders in the reaction chamber, and to increase the reaction time between metal droplets and the reaction gas. Also the arrangement of reactive time enhancer relative to the powder drain can easily be modified for those familiar with the arts. Besides being arranged close to the chamber wall, the powder drain can also be located at any place away from the chamber sidewall as exampled in FIGS. 2A-2B where the powder drain is arranged at the center bottom of reaction chamber.

Figure 3A:
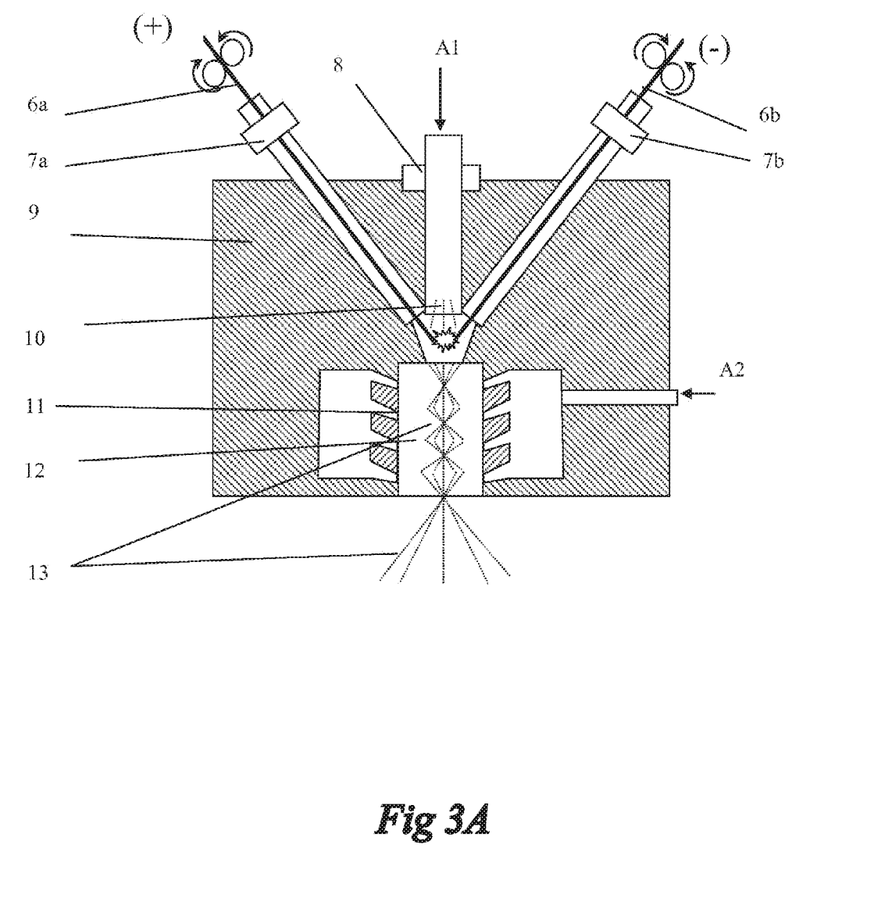
Figure 3B:
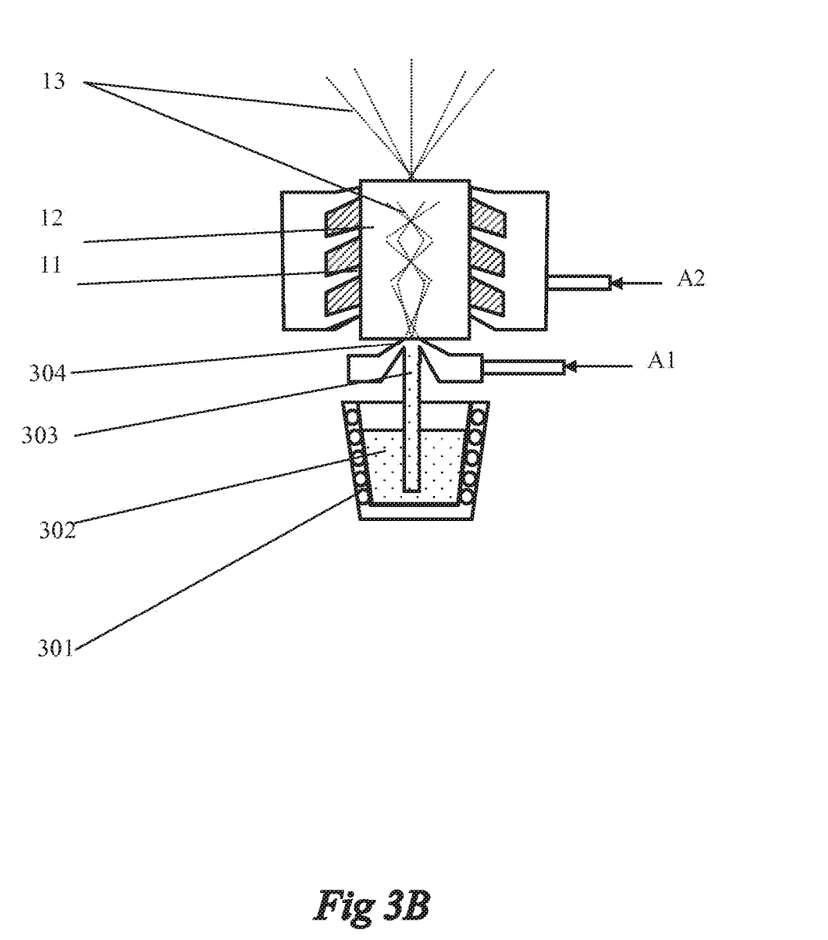

For the metal source melting system, there are a few options. For the two wire arc spray method shown in FIG. 3A, the arc temperature can be up to 6000° C. This temperature is more than enough to provide superheated source metal, thus to make sure the metal droplets stay in liquid state after atomization and to reduce the small metal droplet size. Other heating methods such as induction crucible and plasma spray coating can also be employed for the purpose of melting source meal and to provide proper superheating level. A sample of source metal heating setup with induction crucible is shown in FIG. 3B. The melting metal 302 in the crucible 301 will be feed through a pipette 303 to the injection nozzle 304 and be atomized into metal droplets and carried over to the second-stage atomizer by inert gas from A1. The droplets entering the second stage atomizer are further broken up into ultra-fine droplets. As mentioned earlier, the inert gas does not react with the metal melt, so it would not generate high melting point compound crust at the atomization nozzle. The metal melt generated with these methods can also equally be atomized and be transferred into compound powders, even the superheating level and the size of final compound powders may be different. With these source metal heating options, the heating method shown in the illustration should only be treated as examples, rather than the only option for melting the source metals.

Figure 4A:
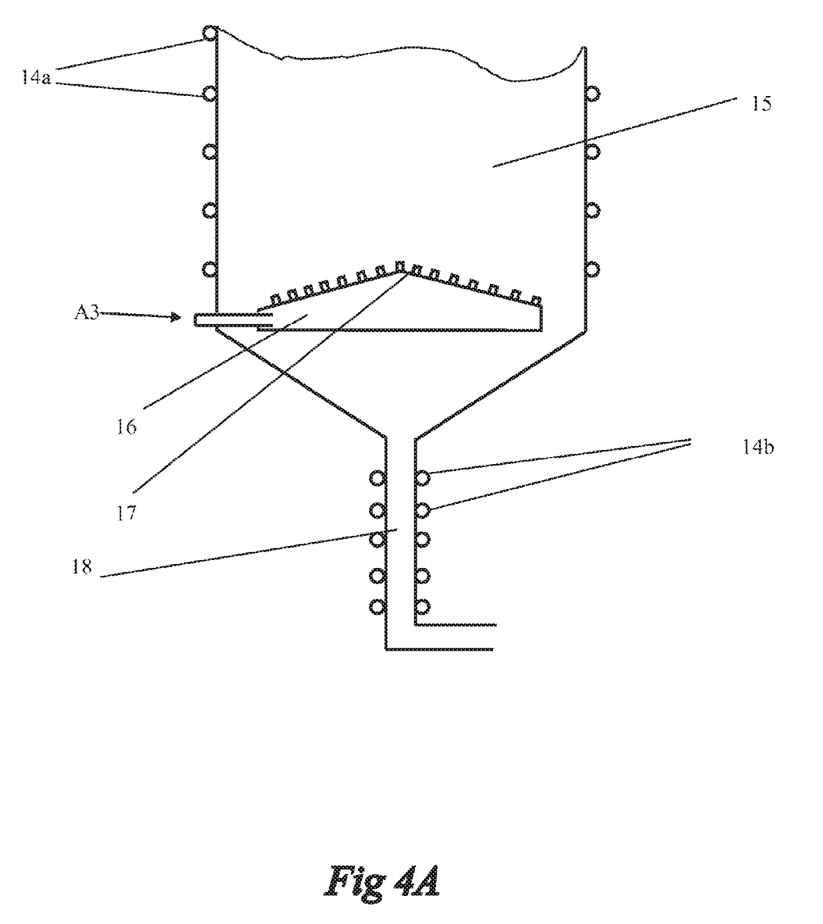
FIGS. 4A-4D show the various arrangements of reaction time enhancer relative to the powder collection outlet in the reaction chamber. The reaction gas flow can be either facing slightly to the reaction chamber wall (FIG. 4A), slightly to the reaction chamber center (FIG. 4B) or directly up (FIG. 4C) while the powder collection outlet is along the center axis. Similar arrangements can be made with the powder collection outlet close to the reaction chamber wall, as depicted in FIG. 4D.
Figure 4B:
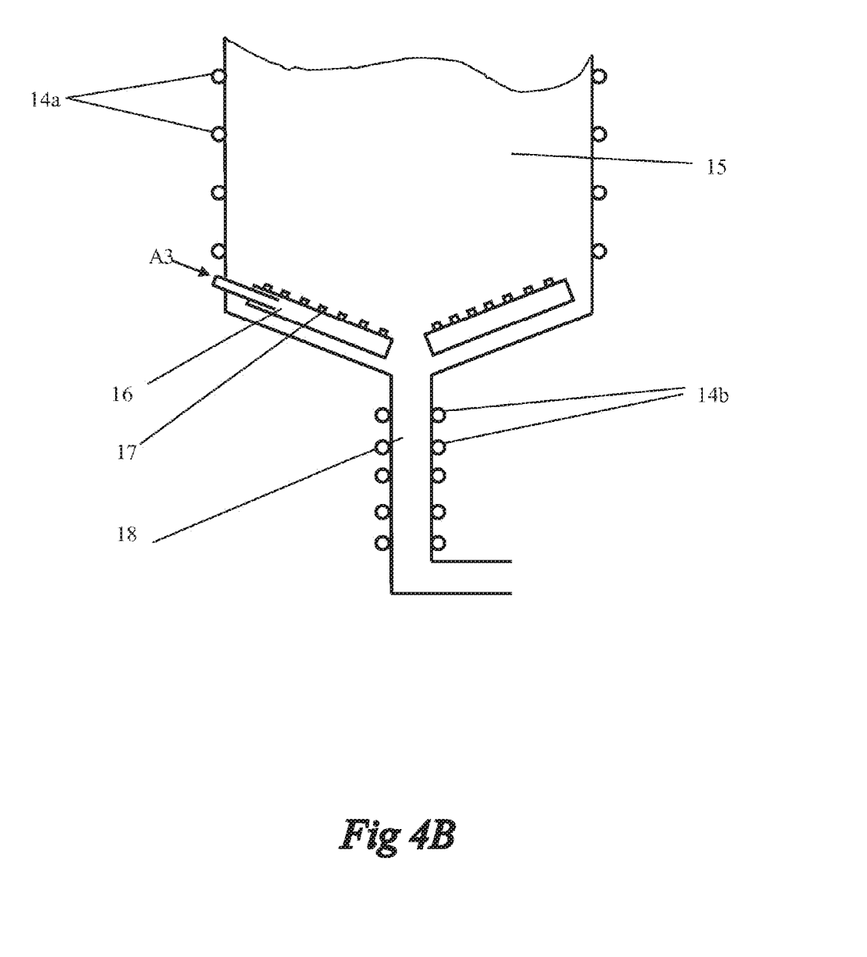
Figure 4C:
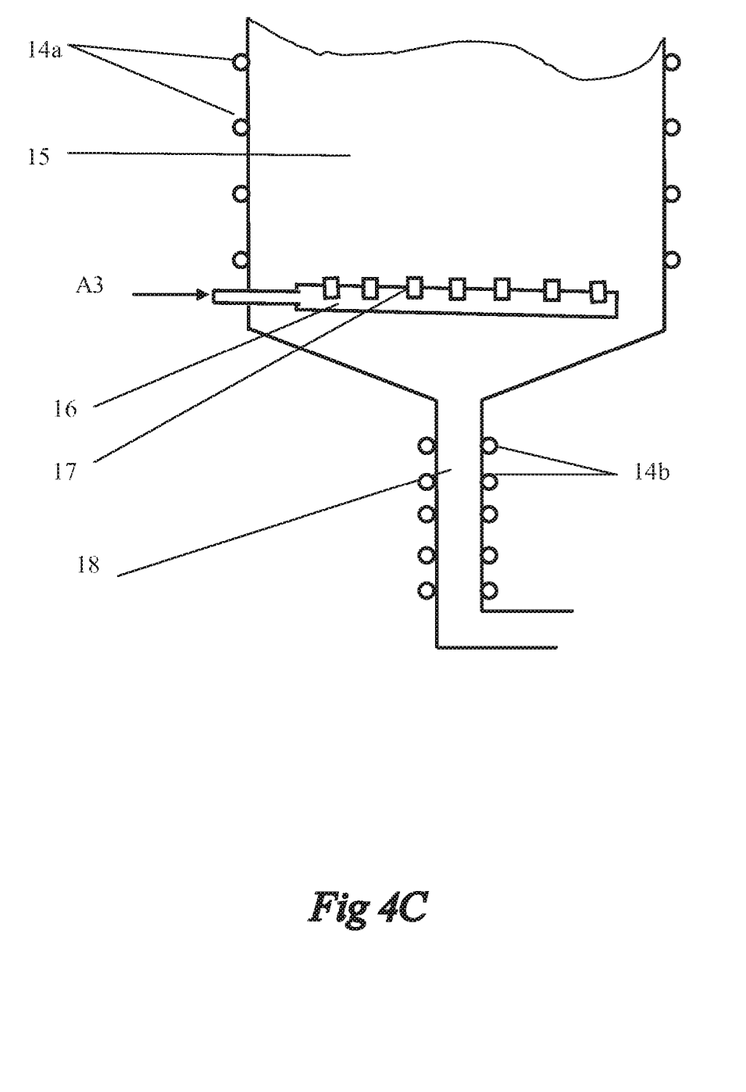
Figure 4D:
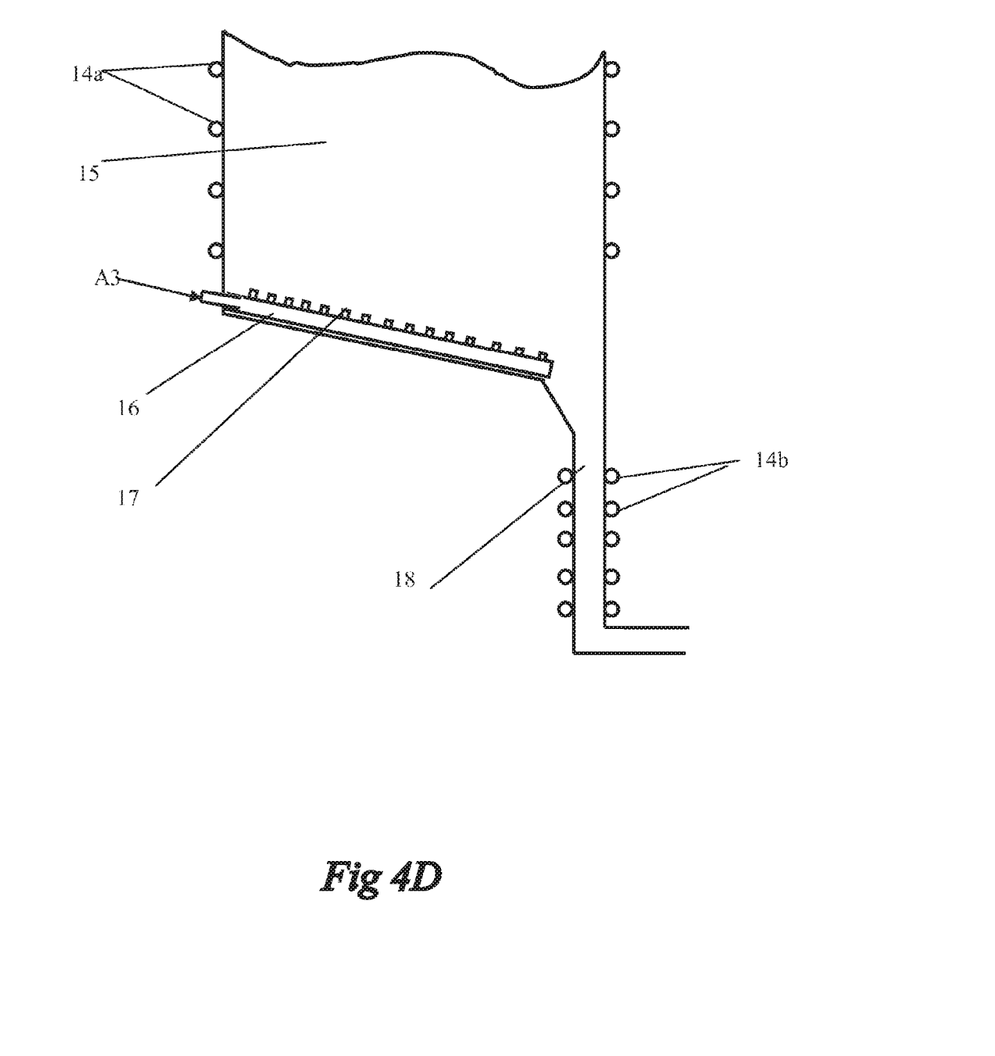

Similarly, it should be recognized that the design of reactive time enhancer, especially the gas spraying directions, can be modified without changing the working principle. The structure, location and orientation can be modified according to preferences. A few examples are provided, as exampled in FIGS. 4A, 4B, 4C and 4D, whereas the reactive gas spraying in the direction of a little bit of outward to the sidewalls (FIG. 4A), inward to the chamber center (FIG. 4B), straightly up (FIG. 4C) or slant to one chamber side (FIG. 4D) while still mainly upward. All these designs share the same principle that the reactive gas moves in reverse to the natural falling direction of droplet and powders, thus to move the falling powders back to the chamber for longer dwelling time to make sure the synthesis reaction be finished.

Figure 5A:
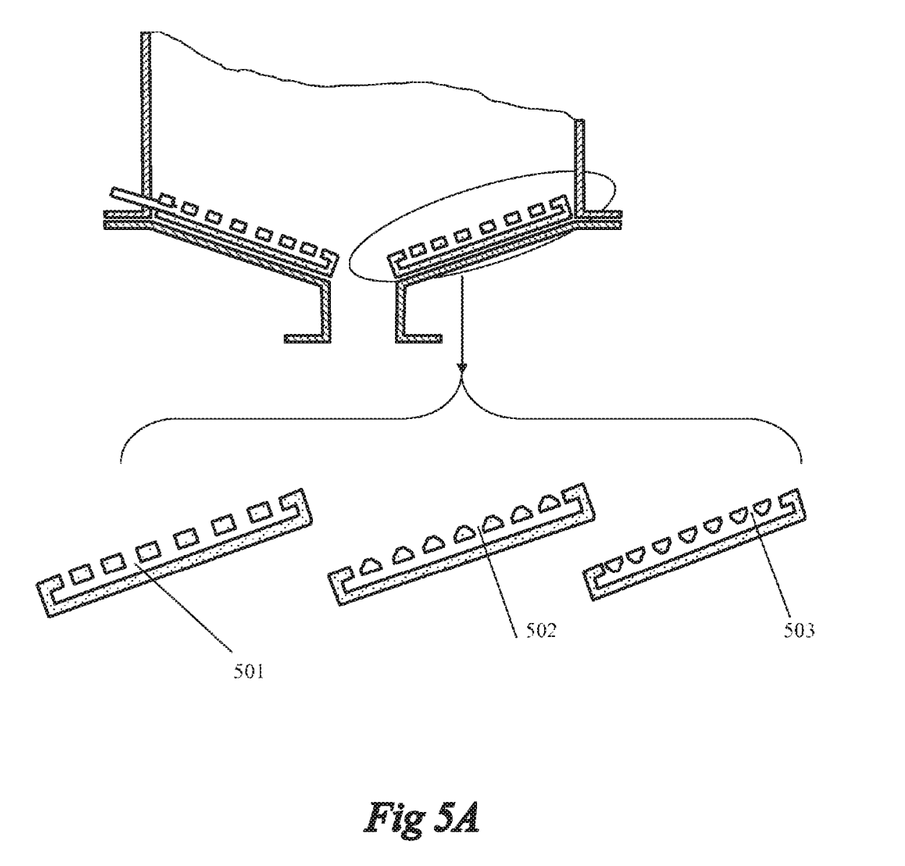
Figure 5B:
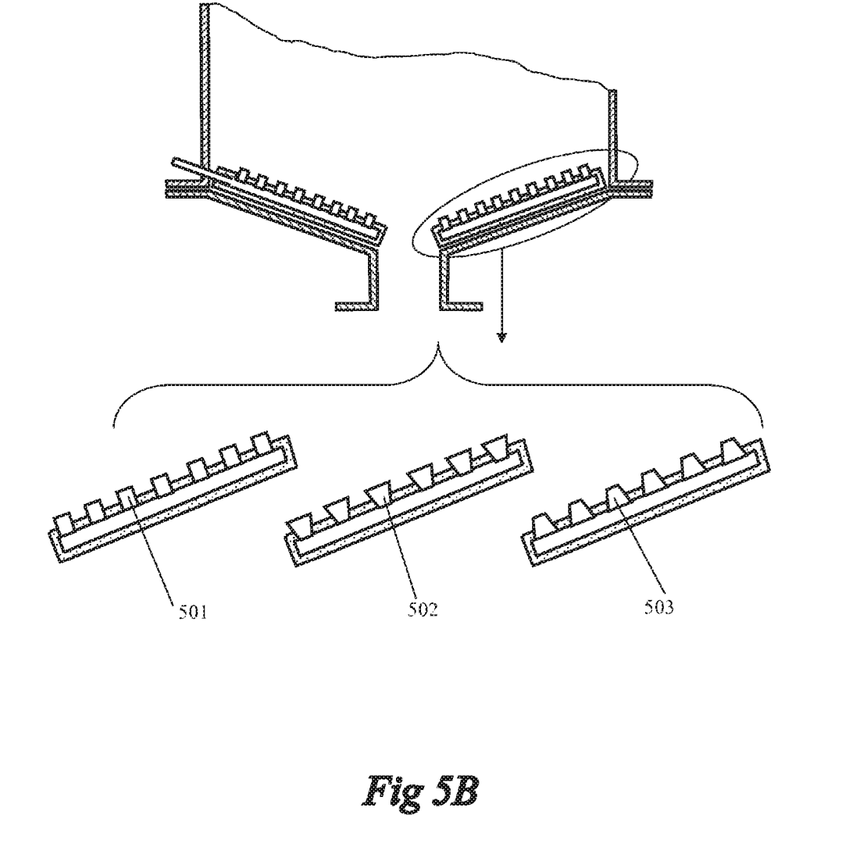

Similarly, the shape, size, amount and arrangement of the gas outlets/orifices of the reaction time enhancer can be optimized too. FIGS. 5A and 5B should only be treated as examples, where the gas outlets are perforated holes on the front surface, or be extruded tubes on the front surface of the reaction time enhancer. The perforated gas openings can be of a few type of designs, such as same diameter between inside and outside openings as in 501, or the insider opening is smaller than the outside openings as in 502, or the inside opening is larger than the outside openings as in 503, as shown in FIG. 5A. Similarly the inside dimension can be equal, smaller or larger than the outside dimension of the protruding tubes as shown in FIG. 5B.

CONCLUSION

A method to manufacture various refractory compound powders is proposed by atomizing the superheated liquid metal at first stage with inert gas and at second stage with reactive gas before being carried into a reaction chamber filled with reactive gas, such as ammonia ($NH_3$), nitrogen ($N_2$), oxygen ($O_2$) or their mixtures. The first atomizing gas functions to break the liquid metal into droplets and to prevent crust formation at the nozzle front, and the second stage atomizing gas breaks the droplets further down into even smaller droplets while reacts with the droplets to transfer the formed metal droplets into compound powders. To prolong the reaction time between metal droplets and the reactive gas, a reaction time enhancer is provided at the lower end of the reaction chamber. The reaction time enhancer works by blowing reactive gas in a different or even reverse direction of moving droplets and powders and driving the droplets circulating or moving back and forth in the reaction chamber, thus to effectively increase the reaction time between metal droplets and powder forming gases. The formed powders are collected and classified with cyclone collection and separation system based on the powder size.

This system can be easily modified for production of other compound powders, such as oxide, hydride, sulfide or halide powders by switching the employed reactive gases.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A method for producing non-metallic, refractory compound powder, the method comprising:
   providing a metal to a first stage of an apparatus;
   superheating, by a heating mechanism in the first stage of the apparatus, the metal to a temperature that is higher than a melting point of the metal;
   supplying an inert gas in the first stage of the apparatus in a way that reduces a probability of a reactive gas inflowing from a second stage of the apparatus into the first stage of the apparatus;
   receiving, in the second stage of the apparatus, the superheated metal in a first direction;
   supplying, in the second stage of the apparatus, the reactive gas to (1) atomize the superheated metal into liquid droplets, and (2) react with the liquid droplets so as to form the non-metallic, refractory compound powder,
   wherein, in an extension of the second stage of the apparatus, at least a portion of the reactive gas is supplied in a second direction that is different than the first direction so as to change a falling direction of the liquid droplets and increase a reaction time available for the liquid droplets and the reactive gas to form the non-metallic, refractory compound powder in the second stage of the apparatus;
   monitoring a temperature and a pressure of the second stage of the apparatus; and selectively diluting the reactive gas with the inert gas based on the monitored temperature and pressure of the second stage of the apparatus.

2. The method of claim 1, wherein the second direction is substantially opposite to the first direction.

3. The method of claim 1, wherein selectively diluting the reactive gas comprises adjusting a flow rate of the reactive gas and a flow rate of the inert gas.

4. The method of claim 1, further comprising:
   cooling, by supplying a coolant at an output of the second stage, the formed non-metallic, refractory compound powder to reduce powder agglomeration.

5. The method of claim 1, further comprising:
   categorizing the formed non-metallic, refractory compound powder based on the powder's size using one or more cyclone powder collectors.

6. The method of claim 5, further comprising:
   cleaning, by using a wet scrubber, residual gas at an output of the one or more cyclone powder collectors.

7. The method of claim 1, further comprising:
   adjusting a nozzle that is responsible for supplying the reactive gas in the second direction so as to change a size of the non-metallic, refractory compound powder formed in the second stage of the apparatus.

8. The method of claim 1, further comprising:
   pumping the first and second stages of the apparatus to a vacuum state before providing the metal to the first stage of the apparatus.

9. The method of claim 1, wherein providing the metal comprises feeding at least two wires of the same metal into the first stage of the apparatus.

10. The method of claim 1, wherein providing the metal comprises feeding at least two wires of different metals into the first stage of the apparatus.

11. The method of claim 1, wherein providing the metal comprises feeding at least two wires into the first stage of the apparatus, and wherein superheating the metal comprises supplying a voltage bias between the at least two wires.

12. The method of claim 11, wherein the voltage bias creates an electric arc in the first stage of the apparatus.

13. The method of claim 11, wherein the voltage bias comprises a direct current (DC) voltage or a power pulse.

14. The method of claim 1, wherein an average diameter of the liquid droplets is below 300 micrometers.

15. The method of claim 1, wherein a cooling rate for the liquid droplets is greater than 100 K per second.

16. The method of claim 1, wherein the reactive gas comprises one or more of: $N_2$, $NH_3$, or $O_2$.

17. The method of claim 1, wherein non-metallic, refractory compound powder comprises one or more of: metal oxide, hydride, nitride, halide, or sulfide.

18. The method of claim 1, wherein the metal is an alloy.

19. The method of claim 1, wherein the metal is a pure metal.

* * * * *